US007107575B1

(12) United States Patent
Mor et al.

(10) Patent No.: US 7,107,575 B1
(45) Date of Patent: Sep. 12, 2006

(54) METHOD AND SYSTEM FOR PROVIDING A SINGLE OBJECT INSTANCE PER CLIENT-SERVER SESSION

(75) Inventors: Yishay Mor, Jerusalem (IL); Kfir Waldman, Tel Mond (IL)

(73) Assignee: Cisco Technology, Inc., San Jose, CA (US)

( * ) Notice: Subject to any disclaimer, the term of this patent is extended or adjusted under 35 U.S.C. 154(b) by 681 days.

(21) Appl. No.: 10/225,903

(22) Filed: Aug. 21, 2002

(51) Int. Cl.
*G06F 9/44* (2006.01)
(52) U.S. Cl. ...................................... 717/120
(58) Field of Classification Search ................ 707/3, 707/8; 709/201, 202; 717/106, 108, 120
See application file for complete search history.

(56) References Cited

U.S. PATENT DOCUMENTS

| | | | | |
|---|---|---|---|---|
| 6,144,989 | A * | 11/2000 | Hodjat et al. ............... | 709/202 |
| 6,453,460 | B1 * | 9/2002 | Keyes ......................... | 717/108 |
| 6,769,079 | B1 * | 7/2004 | Currey et al. ................. | 714/45 |
| 6,779,177 | B1 * | 8/2004 | Bahrs et al. ................. | 717/173 |
| 6,851,105 | B1 * | 2/2005 | Coad et al. .................. | 717/106 |
| 2003/0088659 | A1 * | 5/2003 | Susarla et al. .............. | 709/203 |
| 2004/0078371 | A1 * | 4/2004 | Worrall et al. .............. | 709/223 |
| 2004/0133563 | A1 * | 7/2004 | Harvey et al. ................. | 707/3 |

OTHER PUBLICATIONS

Waldhoff, R., Implementing the Singleton Pattern in Java, Aug. 1998, http://radio.weblogs.com/0122027/stories/2003/10/20/implementingTheSingletonPatternInJava.html.*
Richardson, C., A Pattern Language for J2EE Web Component Development, Sep. 2001 http://jerry.cs.uiuc.edu/~plop/plop2001/accepted_submissions/PLoP2001/crichardson0/PLoP2001_crichardson0_3.pdf.*
Waldhoff, R., Implementing the Singleton Pattern in Java, Aug. 1998, http://radio.weblogs.com/0122027/stories/2003/10/20/implementingTheSingletonPatternInJava.html.*
Richardson, C., A Pattern Language for J2EE Web Component Development, Sep. 2001 http://jerry.cs.uiuc.edu/~plop/plop2001/accepted_submissions/PLoP2001/crichardson0/PLoP2001_crichardson0_3.pdf.*
Erich Gamma et al., "Design Patterns, Elements of Reusable Object-Oriented Software," 1995, pp. 127-136.
Mark Townsend, "Exploring the Singleton Design Pattern," Feb. 2002, Microsoft Corporation, http://msdn.microsoft.com/library/en-us/dnbda/html/singletondespatt.asp?frame=true, printed Jun. 26, 2002, pp. 1-6.

\* cited by examiner

*Primary Examiner*—Wei Zhen
*Assistant Examiner*—Kou-Yi K. Chen
(74) *Attorney, Agent, or Firm*—Hickman Palermo Truong & Becker LLP (57) ABSTRACT

A session singleton object, design pattern, and method for providing computer program code that defines a class for instantiating a session singleton object are disclosed. The class includes a constructor for instantiating the session singleton object, and an access method for accessing the session singleton object. The access method has an input parameter, which is used to locate a session, logic for determining whether the session singleton object exists, logic for creating the session singleton object, and associating the session singleton object with the session only when the session singleton object does not exist, and logic for returning the session singleton to a caller of the access method. Executing the code in a server that is coupled to clients in respective communication sessions results in instantiating one and only one instance of the session singleton object for each of the sessions communicating with the server.

23 Claims, 9 Drawing Sheets

METHOD AND SYSTEM FOR PROVIDING A SINGLE OBJECT INSTANCE PER CLIENT-SERVER SESSION

FIELD OF THE INVENTION

The present invention generally relates to client-server computer programs. The invention relates more specifically to a method and system for providing classes of objects for which a single instance is guaranteed per client-server session.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In client-server software applications, a server typically communicates with multiple clients. Frequently, there is a need to maintain information at the server that corresponds to each of the clients. For example, the server may maintain information defining the state of particular transactions with the clients. Furthermore, there is a need to maintain this information in such a manner that the server has access to the information for all of the clients, while each client only has access to the information associated with itself.

In object-oriented programming, design patterns are used to provide re-usable solutions to a recurring problem. Design patterns are described comprehensively in E. Gamma et al., "Design Patterns: Elements of Reusable Object-Oriented Software" (Reading, Mass.: Addison-Wesley, 1994), ISBN 0-201-63361-2.

A first approach to the client-server computing problem just described would be to use an object class, instantiated into objects at the server, which stores and represents client information. However, such a class would have no inherent limitations on the number of objects that may be instantiated from it. Accordingly, a program using such an approach could potentially instantiate more than one object instance per client. This could lead to storing inconsistent client-related information in different client objects.

Another approach to the problem just described uses programmatic objects that conform to the "singleton" design pattern of Gamma et al. The singleton design pattern ensures that an executing program has only one instance of any class. However, using the singleton pattern would result in instantiation of only one object instance for all of the clients in a client-server application. With only one object instance, it would be impossible to maintain information that corresponds to each of the clients. For example, if a server-side application program maintained a telephone number value in a singleton object, and one client modified its phone number value, then all of the other clients would be affected.

Based on the foregoing, there is a clear need for a better way to maintain information on behalf of multiple clients in a client-server application.

There is a specific need for a method in which each client only has access to the information associated with the respective client, but the server has access to the information associated with all of the clients, and yet the server cannot duplicate information associated with a particular client through multiple object instances.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method for providing a single object instance per client-server session is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Session Singleton Design Pattern |
| | 2.1 Structural and Functional Overview |
| | 2.2 Providing a Session Singleton Object |
| | 2.3 Creating a Session Singleton Object |
| 3.0 | Implementation Mechanisms—Hardware Overview |
| 4.0 | Extensions and Alternatives |

1.0 General Overview

The needs identified in the foregoing Background, and other needs and objects that will become apparent for the following description, are achieved in the present invention, which comprises, in one aspect, a method for providing a single object instance per client-server session.

In one embodiment, computer program code defines a class for instantiating a session singleton object. The class includes a constructor for instantiating the session singleton object, and an access method for accessing the session singleton object. The access method has an input parameter, which is used to locate a session, logic for determining whether the session singleton object exists, logic for creating the session singleton object, and associating the session singleton object with the session only when the session singleton object does not exist, and logic for returning the session singleton to a caller of the access method. Executing the code in a server that is communicatively coupled to a plurality of clients in a plurality of respective communication sessions, results in instantiating one and only one instance of the session singleton object for each of the sessions communicating with the server.

In other aspects, the invention encompasses a computer apparatus, a computer readable medium, and a carrier wave configured to carry out the foregoing steps.

2.0 Session Singleton Design Pattern

2.1 Structural and Functional Overview

Figure 1:
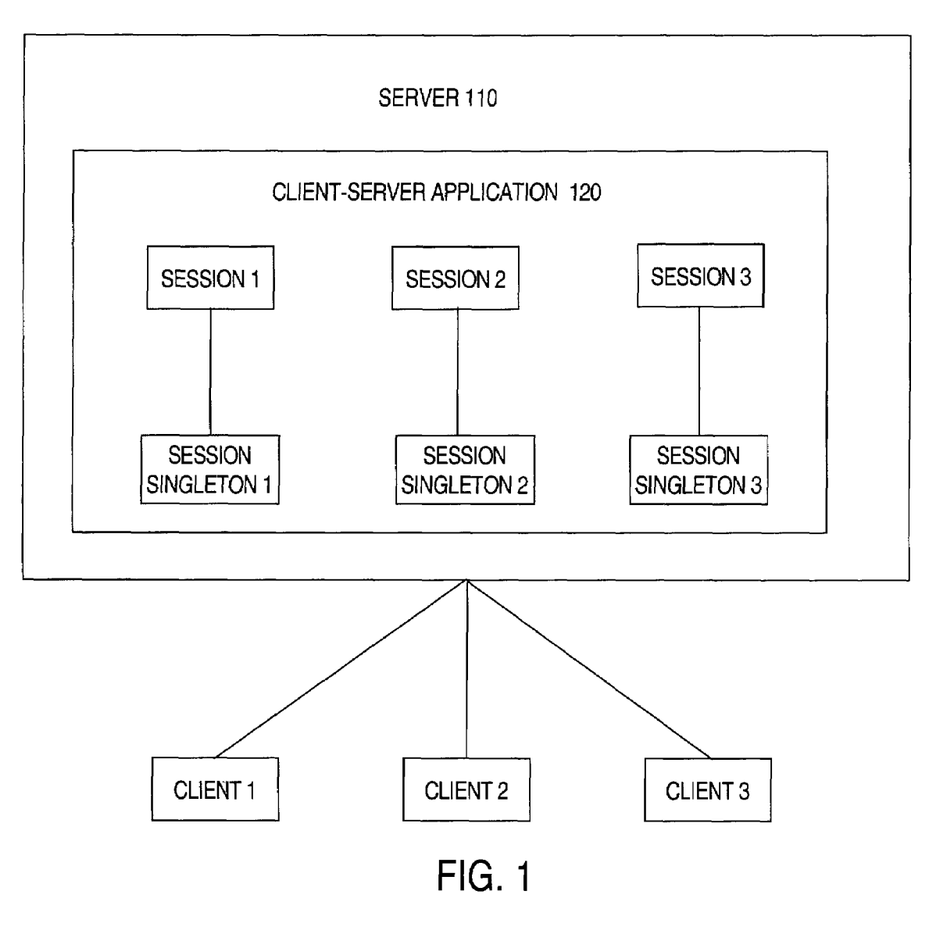
FIG. 1 is a block diagram that illustrates an overview of a system that uses session singletons.

FIG. 1 is a block diagram that illustrates an overview of a client-server system that uses a session singleton design pattern, according to one embodiment. Three clients designated Client 1, Client 2, Client 3 are communicatively coupled to a client-server application 120 hosted on a server 110.

For the purposes of illustrating a clear example, assume that server 110 is a web server that delivers web pages to multiple clients. The clients request web pages from the client-server application 120 during sessions. Client 1 requests web pages during Session 1, Client 2 requests web pages during Session 2, and Client 3 requests web pages during Session 3. A plurality of session singleton objects, designated as Session singleton 1, Session singleton 2, and Session singleton 3 are used to maintain information on behalf of each of the clients during the sessions. Furthermore, the session singleton objects are associated with the session for the client that the session singleton object corresponds to. For example, session singleton 1 is used to maintain information on behalf of client 1 and therefore session singleton 1 is associated with session 1.

The need for maintaining information on behalf of multiple clients in a client-server application, as already described herein, is a problem that is common to most client-server applications. In object oriented programming, design patterns are used to provide re-usable solutions to a recurring problem. Accordingly, Session singleton 1, Session singleton 2, and Session singleton 3 each conform to a session singleton design pattern as described herein.

Figure 2A:
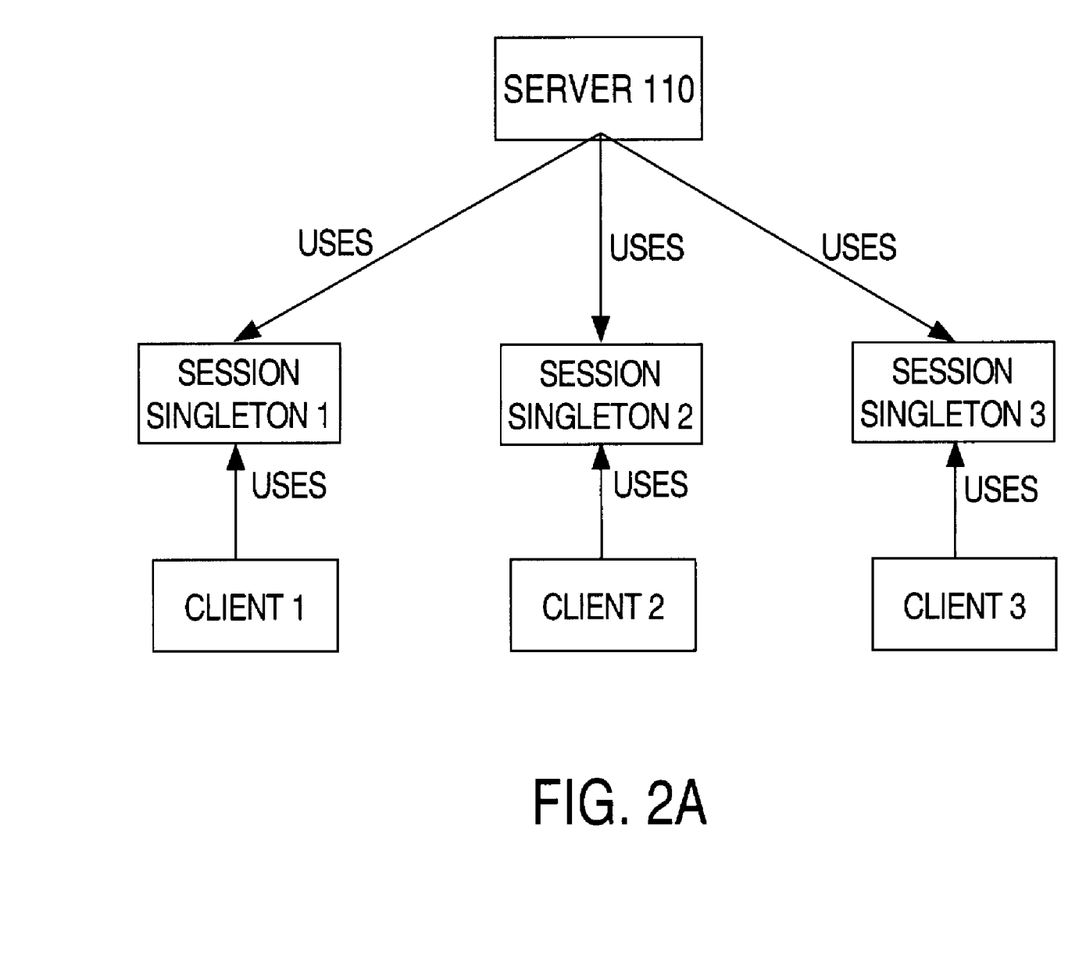
FIG. 2A is a block diagram of the logical model of a session singleton design pattern.

Logical models and physical models may be used to describe the session singleton design pattern. FIG. 2A is a block diagram of the logical model of a session singleton design pattern corresponding to the clients and singleton objects of FIG. 1. A logical model depicts logical relationships among various objects. As depicted in FIG. 2A, server 110 uses session singletons to access information on behalf of multiple clients. For example, server 110 uses Session singleton 1 to access information on behalf of Client 1, uses Session singleton 2 to access information on behalf of Client 2, and uses Session singleton 3 to access information on behalf of client 3. Therefore, server 110 has access to all of the session singletons for all of the clients that are communicating with server 110. However, each client only has access to the session singleton object that corresponds to that particular client. For example, Client 1 only has access to Session singleton 1, Client 2 only has access to Session singleton 2, and Client 3 only has access to Session singleton 3.

In object oriented programming, classes define and are used to create objects. The classes are used to define the structure of data and methods, which access the data. When an object for a particular class is created, the object can store data that conforms to the structure defined in the class and the methods in the object can access the stored data.

Figure 2B:
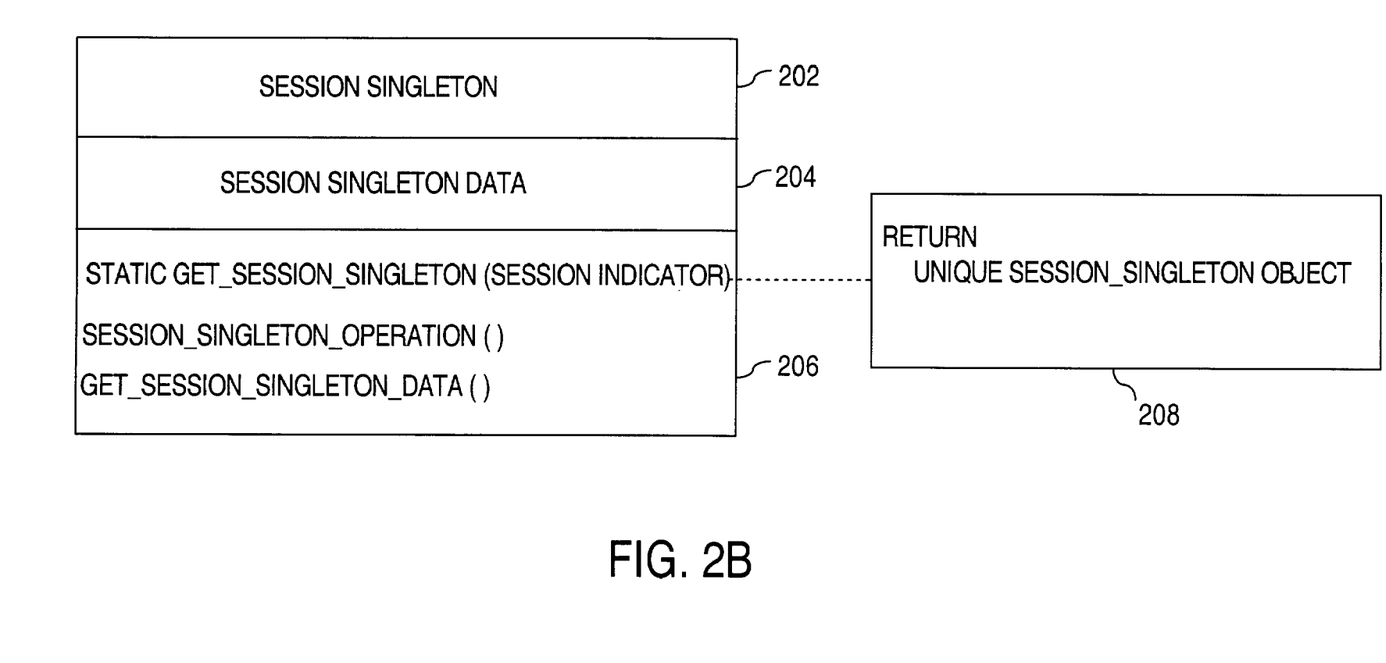
FIG. 2B is a block diagram of a data model for a session singleton design pattern.

A high level view of the data and the methods of the classes used in a design pattern provide a physical model of a design pattern. FIG. 2B is a block diagram of a data model for a session singleton design pattern as defined herein. The session singleton design pattern has a name, data and methods. The design pattern name is "session singleton," as indicated by block 202. Session singleton data 204 and methods 206 are associated with the design pattern.

Session singleton data 204 is unique for each session singleton. Any kind of data that needs to be maintained on behalf of a particular client can be stored in the session singleton data 204. This data may be user preference data. For example, a font setting for text displayed by a client, or a phone number that a particular client is using may be maintained in the session singleton data 204. These examples are provided merely as illustrations, and any other data may be used.

One or more methods 206 are associated with the session singleton. For example, a get_session_singleton method is used to obtain the unique session singleton object 208. The get_session_singleton method is a static method so that it can be invoked before the session singleton object exists. The get_session_singleton method is described in more detail herein with reference to FIGS. 4A, 4B, 5A, and 5B. A session_singleton_operation method may be used to modify session singleton data 204. For example, a client-server application can modify the font for a particular client by invoking a session_singleton_operation. A get_session_singleton_data method is used to obtain session singleton data 204. For example, a client-server application can obtain the font then currently used for a particular client by invoking the get_session_singleton_data method.

Since session singleton objects are associated with sessions, a session indicator is passed into the get_session_singleton method of the methods 206. The get_session_singleton method can use the session indicator to locate the session singleton object, which is referenced by the session. Among other things, the session indicator may be a session object, a key or a number that identifies the session object, or a parameter that references the session object. The parameter that references the session object may be a request object, as described further herein. The session object may be comprised of any information that describes the session.

Figure 3:
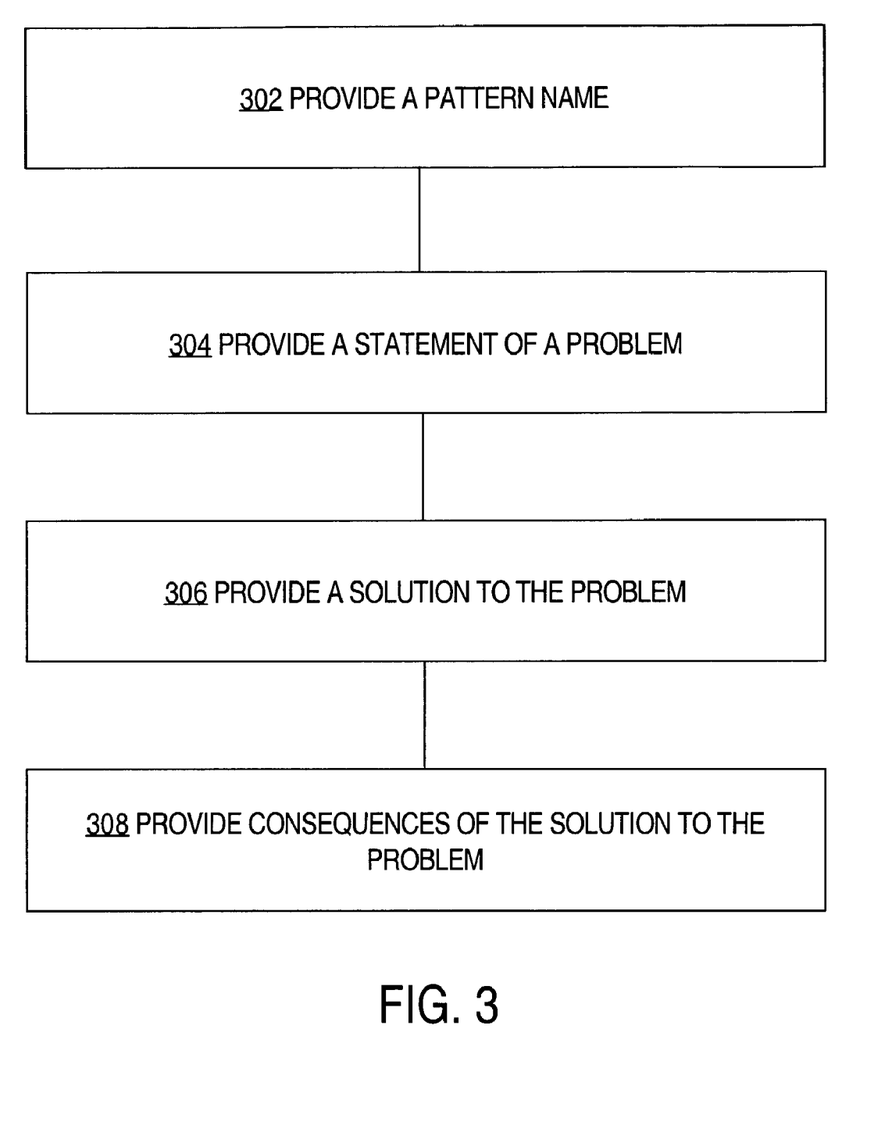
FIG. 3 is a flow diagram that illustrates one embodiment for a method of providing a session singleton design pattern.

As described in Gamma et al., a design pattern has four elements comprising a pattern name, a statement of a problem, a solution to the problem, and the consequences of the solution to the problem. FIG. 3 is a flow diagram that illustrates one embodiment for providing a session singleton design pattern.

At step 302, a pattern name is provided. In one embodiment, the pattern name is "session singleton."

At step 304, a statement of a problem is provided, which refers to the need to associate an object with each of a plurality of clients so that each client can access only one object that is associated with a particular client but the server can access all of the objects that are associated with each of the clients. For example, a session singleton object is associated with a plurality of clients, such as Client 1, Client 2, and Client 3. Each client can access only one object. For example, Client 1 can only access Session singleton 1, Client 2 can only access Session singleton 2, and Client 3 can only access Session singleton 3. However, the server 110 can access Session singleton 1, Session singleton 2, and Session singleton 3.

At step 306, a solution to the problem is provided. The solution is to provide a programmatic object that is guaranteed to have only one instance per session of a client and server. This solution will be described in more detail hereinafter.

At step 308, consequences of the solution to the problem are provided. The consequences are that each client, of the plurality of clients, can access only the one object that is associated with that particular client, but the server can access all of the object that are associated with each of the clients.

2.2 Providing a Session Singleton Object

Figure 4A:
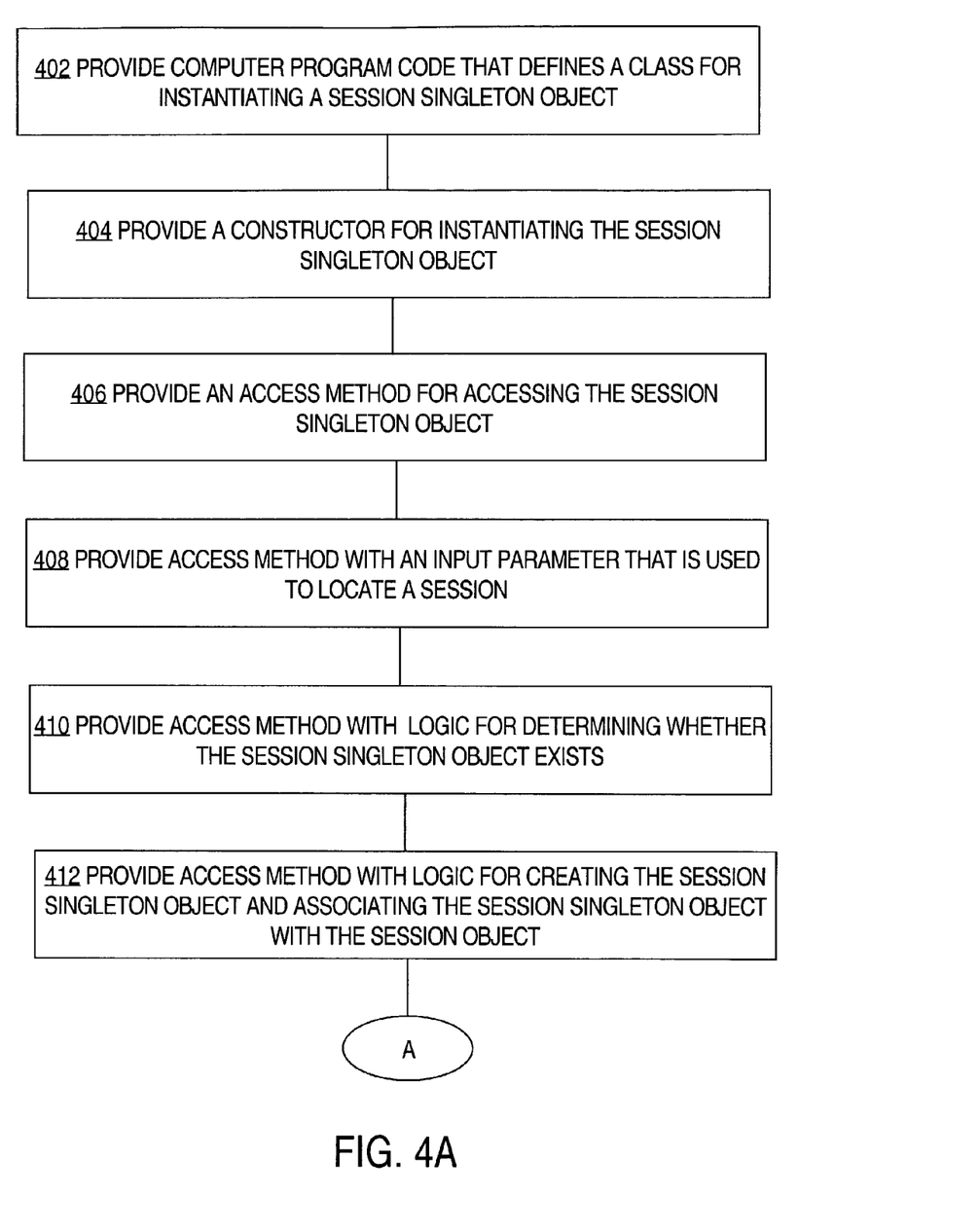
FIG. 4A and FIG. 4B are flow diagrams that illustrate one embodiment for a method of providing a session singleton object.
Figure 4B:
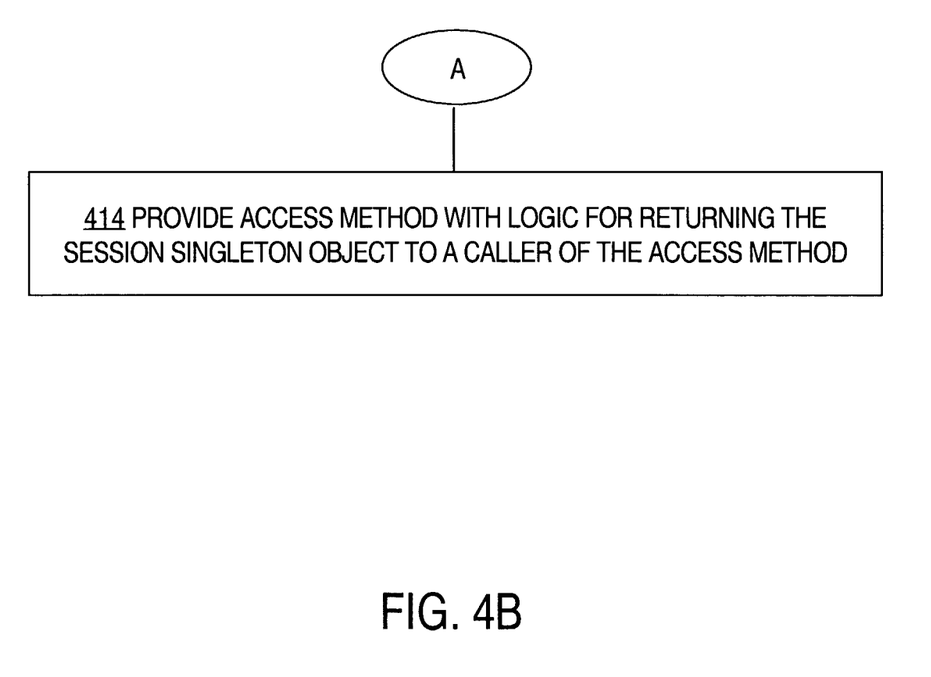

FIG. 4A and FIG. 4B are flow diagrams that illustrate one embodiment for a method of providing a session singleton object. Table 1 below depicts sample code in the Java® language for a class, called SessionSingleton, which is used for creating a session singleton object according to one embodiment. The lines of code in Table 1 are numbered. For the purposes of explanation, the sample code in Table 1 is described in conjunction with FIGS. 4A and 4B to illustrate one embodiment of the method for providing a session singleton object.

TABLE 1

A session singleton class

```
1   import javax.servlet.http.*;
2   public class SessionSingleton {
3       private SessionSingleton ( ) { }
4       public static SessionSingleton getSessionSingleton (HttpSession session) {
5           SessionSingleton theSingleton =
6               session.getAttribute("_SESSION_SINGLETON_");
7           if(theSingleton == null) {
8               theSingleton new SessionSingleton( );
9               session.setAttribute("_SESSION_SINGLETON_", theSingleton);
10          }
11          return theSingleton;
12      }
13  }
```

At step 402, computer program code, which defines a class for instantiating a session singleton object, is provided. Table 1 depicts sample code for the class called SessionSingleton, which is used for creating a session singleton object. Step 402 may involve creating or providing code corresponding to Table 1.

At step 404, a constructor for instantiating the session singleton object is provided. Objects are created by constructors, which are in the class that the object is instantiated from. In order to ensure that there is only one session singleton object per client-server session, it is important to block other classes from invoking the constructor in an uncontrolled manner. This is achieved by declaring the constructor as private or protected. For example, the session singleton constructor, as depicted on line 3 of Table 1, is declared as private. Since the constructor is private, the constructor cannot be accessed by code that is outside of the session singleton class.

At step 406, an access method for accessing the session singleton object is provided. The access method allows a process, such as a process in a client-server application, to obtain or to create a session singleton object. In one embodiment, a getSessionSingleton method, as depicted on lines 4 through 10, is provided. The getSessionSingleton method is declared as public on line 4 and therefore the process can invoke it.

At step 408, the access method is provided with has an input parameter that is used to locate a session object. For example, on line 4 of Table 1, a session object is passed into the getSessionSingleton method. The standard Java® API for web applications is used to create the session object and therefore the session object, on line 4, is an HttpSession object. The input parameter may be a session indicator or a session object as described above.

At step 410, the access method is provided with logic for determining whether the session singleton object exists. For example, on lines 5 and 6 of Table 1, the getAttribute method of the session object is invoked to retrieve the value in an attribute, which references the session singleton object, of the session object. In this example, the attribute is associated with a key, "_SESSION_SINGLETON_", which is passed into the getAttribute method. The value of the attribute is stored in the variable theSingleton when the value is returned by the getAttribute method. If a session singleton object exists, then the variable theSingleton contains a reference to the session singleton object; otherwise, the variable theSingleton contains a null value. On line 7 of Table 1, the code determines whether the variable theSingleton contains a null value.

At step 412, the access method is provided with logic for creating the session singleton object and associating the session singleton object with the session. For example, execution of the code on line 8 of Table 1 results in the invocation of the private constructor, SessionSingleton, which is shown on line 3. The SessionSingleton constructor returns a new session singleton object, which is stored in the variable theSingleton. Line 9 depicts the associating of the session singleton object with the session object. For example, the setAttribute method saves the variable theSingleton in the attribute, which is associated with the key "_SESSION_SINGLETON_", of the session object.

Referring now to FIG. 4B, at step 414, the access method is provided with logic for returning the session singleton object to a caller of the access method. For example, line 9 depicts returning the session singleton object to the caller of the method getSessionSingleton.

2.3 Creating a Session Singleton Object

Figure 5A:
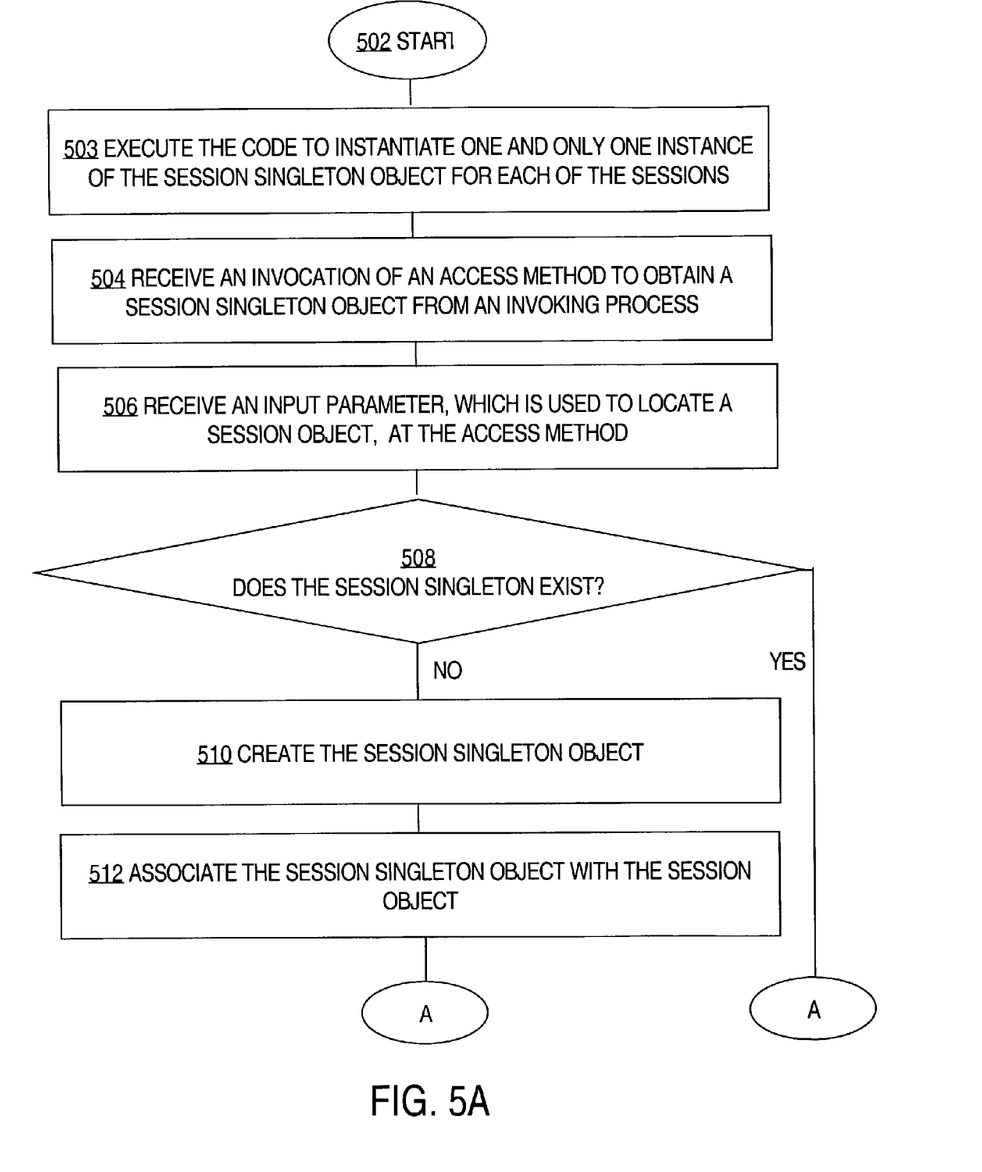
FIG. 5A and FIG. 5B are flow diagrams that illustrate one embodiment for a method of creating a session singleton object.
Figure 5B:
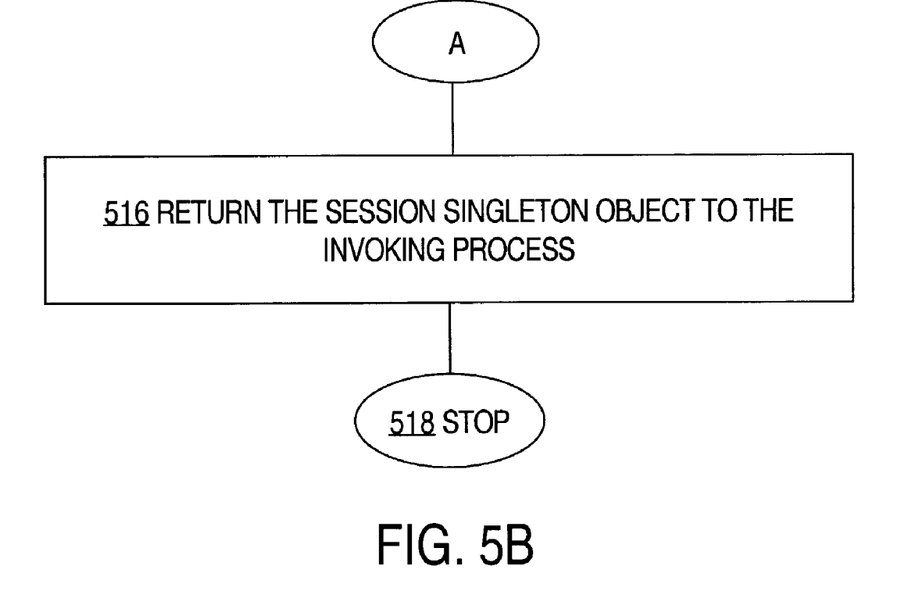

FIG. 5A and FIG. 5B are flow diagrams that illustrate one embodiment for a method of creating a session singleton object. For purposes of illustrating a simple example, Table 1 is used to describe the method shown in FIG. 5A and FIG. 5B.

At step 502, the method starts. At step 503, the computer program code for instantiating one and only one instance of the session singleton object for each of the sessions, is executed. For the purposes of illustration, the computer program code, as described in steps 402 through 414 of FIG. 4A and FIG. 4B, is on a server, such as server 110 of FIG. 1, which is communicatively coupled to a plurality of clients in a plurality of respective communication sessions. Executing the computer program code results in instantiating one and only one instance of the session singleton object for each of the sessions. For example, Session singleton 1 is only associated with Session 1.

Table 2 depicts sample code for a class, called Session-Singleton2, which is used for creating a session singleton object according to another embodiment. The SessionSingleton2 class is used for creating a session singleton object for any class as will be described in more detail hereinafter.

passing a true value into the "create" variable. Furthermore, the invoking process indicates that the getSessionSingleton2 method should return a null value and not create a session singleton object if it does not exist by passing a false value into the "create" variable.

At line 6, the session object is retrieved from the request object. At line 9, a potential reference to the session singleton object is retrieved from the session object.

TABLE 2

A session singleton class

```
1   import javax.servlet. *;
2   import javax.servlet.http.*;
3   public class SessionSingleton2 {
4       protected SessionSingleton2 ( ) { }
5       public static object getSessionSingleton2(HttpServletRequest request, Class c, boolean create) {
6           HttpSession session = request.getSession( );
7           Object theSingleton = null;
8           String className = c.getName( );
9           theSingleton = session.getAttribute(className);
10          if(theSingleton == null && create) {
11              theSingleton = c.newInstance( );
12              session.setAttribute(className, theSingleton);
13          }
14      return theSingleton;
15      }
16      public static Object getSessionSingleton2(HttpServletRequest request, Class c)
17      {
18          return getSessionSingleton2(request, c, false);
19      }
20  }
```

Since the sample code in Table 2 is similar to the sample code in Table 1, only the main differences between the two sample codes is described herein.

The getSessionSingleton2 method, as depicted on lines 5 through 15, is a public method that a process can invoke to create a session singleton object. For the purposes of explanation, this process may be running in a client-server application 120.

On line 5, three input parameters identified as the request object, class c, and create, are specified for the getSessionSingleton2 method. The first parameter, request object, enables the getSessionSingleton2 method to locate the session as will be described hereinafter. When a user enters in a URL on their browser, a request is sent to the web server and a response is returned. Information that pertains to the request and response are encapsulated by the standard Java® API for web applications into objects. In one embodiment, as shown in line 5, an HttpServletRequest object from the standard API for web applications is used to create the request object.

The second parameter, class c, specifies the class from which the session singleton object is later created. The name of class c is also used as a key, which enables the getSessionSingleton2 method, to access an attribute in a session object. The attribute is used to reference the session singleton object as will be described in more detail.

The third parameter, create, is a Boolean variable having a value that specifies whether the getSessionSingleton2 method is invoked in "create" mode or "get" mode. In so doing, the invoking process may indicate the desired behavior in the event than the session singleton object does not exist. For example, the invoking process indicates that the getSessionSingleton2 method should create a session singleton object variable and return a reference to the newly created session singleton object if it does not already exist by At line 10, a determination is made as to whether the session singleton object already exists, and whether the getSessionSingleton2 method has been invoked in create mode. If the session singleton object does not exist and the getSessionSingleton2 method has been invoked in create mode, then the session singleton object is created and associated with the session object on lines 11 and 12. For example, on line 11, the method newInstance, in the class c, is invoked to create a session singleton object from the class c. Java has a class called "Class" where each instance of this class describes a particular class. In so doing, "c" is an object of class Class and therefore, the class "c" can be used to create an instance of the session singleton when c.newInstance( ), which is equivalent to invoking new ClassName( ), is invoked. On line 12, the class c's name is passed into the setAttribute method, as a key, for saving the reference to the newly created session singleton object into the session object.

Lines 16 through 19 depict an overloaded version of the method getSessionSingleton2, which is used to obtain a reference to an existing session singleton object. On line 16, the "create" variable is omitted. However, on line 18, a "false" value for the create variable is passed into the getSessionSingleton2 method, which results in the invocation of the getSessionSingleton2 method, as depicted on lines 5 through 15. When "false" is passed into the create parameter, on line 5, the getSessionSingleton2 returns a reference to an existing session singleton object.

SessionSingleton2, as depicted in Table 2, can be used to create a session singleton object from any class, which is passed into the input parameter class c.

At step 504, a process invokes an access method to obtain a session singleton object. For example, a process, such as a process in the client-server application 120, invokes the getSessionSingleton method, as depicted on lines 4 through 10, to create the session singleton object.

At step 506, the access method, receives an input parameter, which is used to locate a session. For example, on line 4, a session object is passed into the getSessionSingleton method. The input parameter may be a session indicator or a session object as described above.

At step 508, a test is performed to determine whether the session singleton object exists. For example, on lines 5 and 6, an attribute in the session object is accessed to obtain a potential reference to the session singleton object, as described above. The value in the attribute is saved in the variable theSingleton. On line 7, a determination is made as to whether the session singleton object exists by testing if the theSingleton is null.

At step 510, a session singleton object is created. For example, since the variable theSingleton contains a null value, a session singleton object does not exist and is created on line 8 in the manner described above. At step 512, the session singleton object is associated with the session. For example, on line 9, the newly created session singleton object is associated with the session object in the manner described above.

At step 514, the session singleton object is returned to the invoking process. For example, on line 11, the session singleton object is returned to the invoking process, as already described herein. At step 518, the process ends.

Table 3 presents an example of how to use the SessionSingleton2 class to create and to initialize a session singleton object.

TABLE 3

Using SessionSingleton2 to create and initialize a session singleton object

```
1    SessionSingleton2 x;
2    x = getSessionSingleton2(request, c, false);
3    if (x == null) {
4        x = getSessionSingleton2(request, c, true);
5        x.init(y, z);
6    }
```

Table 3 depicts sample computer program code for creating a new session singleton object, for the class SessionSingleton2, which is depicted in Table 2, and initializing the newly created session singleton object. Another way to create and initialize the session singleton is to provide an overloaded method, such as getSessionSingleton2(request, c, true, y, z), that has the same logic as seen in Table 2, except that the overloaded method receives more parameters, such as y and z, for initialization, and initialization logic is inserted after line 11 of table 2. If this overloaded method detects, at line 10, that the session singleton object already exists, then the initialization logic is not performed.

3.0 Implementation Mechanisms—Hardware Overview

Figure 6:
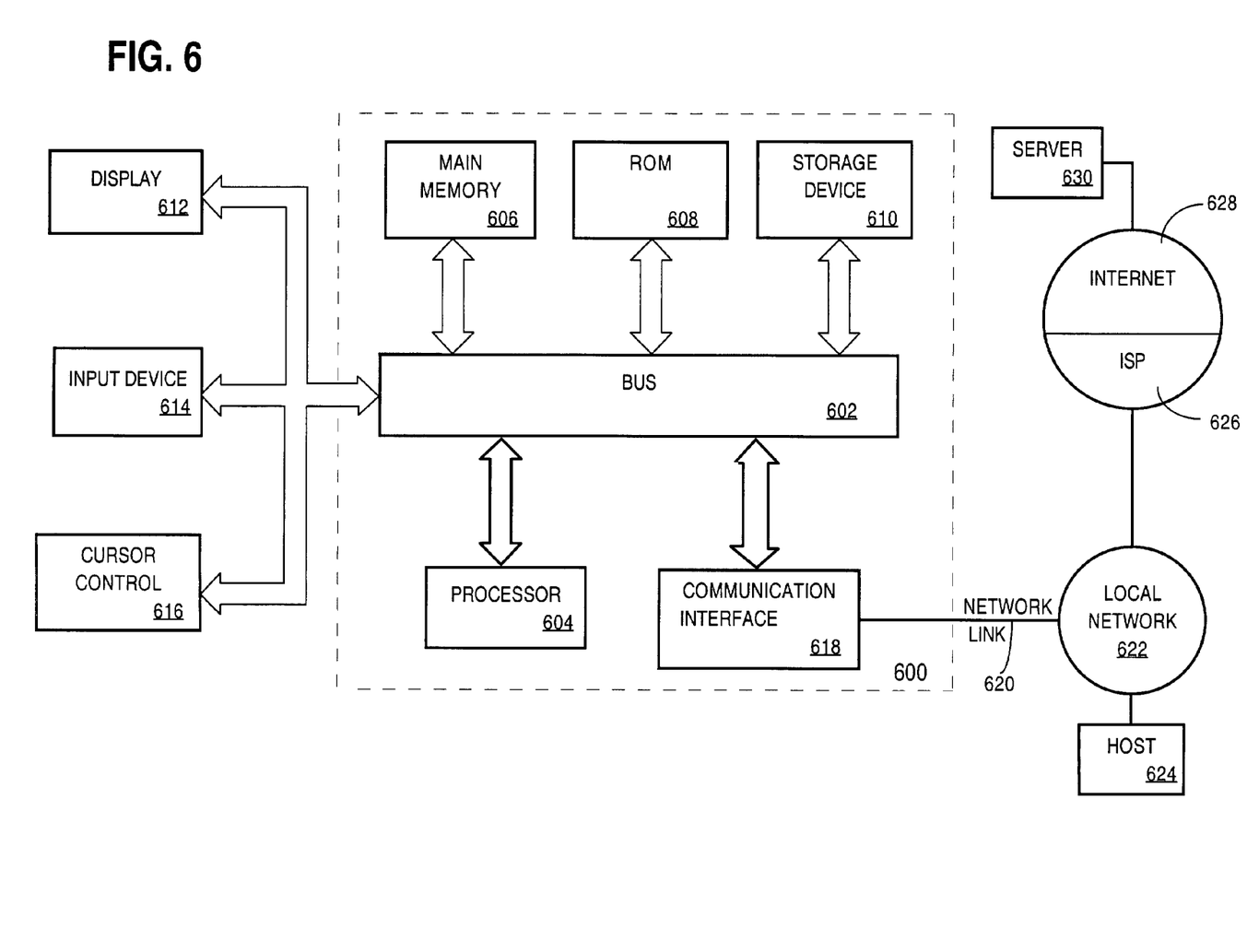
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for providing a programmatic object that is guaranteed to have only one instance per session of a client and server. According to one embodiment of the invention, a method for providing a programmatic object that is guaranteed to have only one instance per session of a client and server is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides a method for providing a programmatic object that is guaranteed to have only one instance per session of a client and server as described herein.

The received code may be executed by processor 604 as it is received, and/or stored in storage device 610, or other non-volatile storage for later execution. In this manner, computer system 600 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Although, for the purposes of explanation, session objects were used as the mechanism for referencing a session singleton object, other mechanisms, such as cookies, may be used for the same purpose.

What is claimed is:

1. A method of providing a programmatic object that is guaranteed to have only one instance per session of a client and server, the method comprising the computer-implemented steps of:

receiving computer program code that defines a class for instantiating a session singleton object, wherein the class includes, (I) a constructor, which is only accessible from inside the class, for instantiating the session singleton object;

(II) an access method for accessing the session singleton object, wherein the access method has, (A) an input parameter, which is used to locate a session object associated with a client-server session, (B) logic for determining whether the session singleton object exists, (C) logic for creating the session singleton object, and associating the session singleton object with the session object only when the session singleton object does not exist, (D) logic for returning the session singleton object to a caller of the access method; and executing the code in a server that is communicatively coupled to a plurality of clients in a plurality of respective communication sessions, wherein the server has access to the information for all of the plurality of clients and executing the code results in instantiating one and only one instance of the session singleton object for each of the session objects and creating and storing in the instance one and only one set of information associated with a particular client.

2. A method as recited in claim 1, wherein the logic for determining whether the session singleton object exists further comprises the logic for determining whether the session singleton object is associated with the session object.

3. A method as recited in claim 1, wherein the logic for determining whether the session singleton object exists further comprises the logic for determining that the session singleton object is not associated with the session object.

4. A method as recited in claim 1, wherein an attribute, which references the session singleton object, is associated with the session object.

5. The method as recited in claim 1, wherein the session singleton object is a first session singleton object that is only associated with a first client-server session, and a second session singleton object is associated only with a second client-server session.

6. The method as recited in claim 1, wherein the server uses the session object to access the session singleton object.

7. The method as recited in claim 1, wherein the declaration of the constructor is selected from a group consisting of private and protected.

8. A method as recited in claim 1, wherein the access method is declared as public static.

9. A method as recited in claim 1, wherein the session singleton object includes data associated with a particular user.

10. A method as recited in claim 9, wherein the data is user preference data.

11. A method of creating a programmatic object that is guaranteed to have only one instance per session of a client and server, the method comprising the computer-implemented steps of:

receiving an invocation of an access method to obtain a session singleton object from an invoking process;

receiving an input parameter, which is used to locate a then-current client-server session object, at the access method;

determining whether the session singleton object exists;

if the session singleton object does not exist, then creating one and only one session singleton object, by invoking a constructor that is only accessible to a class that the access method belongs to, for use in association with the session object, associating the session singleton object with the session object; and returning the session singleton object to the invoking process.

12. A method as recited in claim 11, wherein the step for determining whether the session singleton object exists further comprises the step for determining whether the session singleton object is associated with the session object.

13. A method as recited in claim 11, wherein the step for determining whether the session singleton object exists further comprises the step for determining that the session singleton object is not associated with the session object.

14. A method as recited in claim 11, wherein an attribute, which references the session singleton object, is associated with the session object.

15. The method as recited in claim 11, wherein the session singleton object is a first session singleton object that is only associated with a first client-server session object, and a second session singleton object is associated only with a second client-server session object.

16. The method as recited in claim 11, wherein a server uses the session object to access the session singleton object.

17. The method as recited in claim 11, wherein the declaration of the constructor is selected from a group consisting of private and protected.

18. A method as recited in claim 11, wherein the access method is declared as public static.

19. A method as recited in claim 11, wherein the session singleton object includes data associated with a particular user.

20. A method as recited in claim 19, wherein the data is user preference data.

21. A design pattern implementation executing on a computer and stored on a computer-readable medium for an object-oriented programming object that is guaranteed to have one and only one instance for each client-server session, comprising:

pattern name that references a session singleton;

a statement of a problem that refers to needing to associate an object with each of a plurality of clients so that each client can access only one object that is associated with a particular client, but the server can access all of the objects that are associated with each of the clients;

a description of a solution to the problem, wherein the solution is to provide (I) a constructor, which is only accessible from inside a class, for instantiating a session singleton object;

(II) an access method for accessing the session singleton object, wherein the access method has, (A) an input parameter, which is used to locate a session object, (B) logic for determining whether the session singleton object exists, (C) logic for creating the session singleton object, and associating the session singleton object with the session object only when the session singleton object does not exist, (D) logic for returning the session singleton object to a caller of the access method; and a description of consequences of the solution to the problem, wherein the consequences are that each client, of the plurality of clients, can access only the one object that is associated with that particular client, but the server can access all of the objects that are associated with each of the clients.

22. A computer-readable tangible storage medium comprising one or more sequences of instructions for providing a programmatic object that is guaranteed to have only one instance per session of a client and server that is communicatively coupled to a plurality of clients in a plurality of respective communication sessions, said sequences of instructions comprising a class for instantiating a session singleton object, wherein the class comprises:

(I) a constructor, which is only accessible from inside the class, for instantiating the session singleton object;

(II) an access method for accessing the session singleton object, wherein the access method has, (A) an input parameter, which is used to locate a session object associated with a client-server session, (B) logic for determining whether the session singleton object exists, (C) logic for creating the session singleton object, and associating the session singleton object with the session object only when the session singleton object does not exist;

(D) logic for returning the session singleton object to a caller of the access method, and executing the code in a server that is communicatively coupled to a plurality of clients in a plurality of respective communication sessions, wherein the server has access to the information for all of the plurality of clients and executing the code results in instantiating one and only one instance of the session singleton object for each of the session objects and creating and storing in the instance one and only one set of information associated with a particular client.

23. Apparatus for providing a programmatic object that is guaranteed to have only one instance per session of a client and server, the apparatus comprising:

one or more processors;

a network interface that communicatively couples the one or more processors to one or more clients, directly or indirectly through one or more networks;

computer program code accessible to the one or more processors that defines a class for instantiating a session singleton object, wherein the class includes, (I) a constructor, which is only accessible from inside the class, for instantiating the session singleton object;

(II) an access method for accessing the session singleton object, wherein the access method has, (A) an input parameter, which is used to locate a session object associated with a client-server session, (B) logic for determining whether the session singleton object exists, (C) logic for creating the session singleton object, and associating the session singleton object with the session object only when the session singleton object does not exist, (D) logic for returning the session singleton object to a caller of the access method, and executing the code in a server that is communicatively coupled to a plurality of clients in a plurality of respective communication sessions, wherein the server has access to the information for all of the plurality of clients and executing the code results in instantiating one and only one instance of the session singleton object for each of the session objects and creating and storing in the instance one and only one set of information associated with a particular client.

* * * * *